(12) United States Patent
Luo

(10) Patent No.: US 12,606,268 B2
(45) Date of Patent: Apr. 21, 2026

(54) TRANSMISSION MECHANISM AND BICYCLE

(71) Applicant: SHENZHEN NANBO AUTOMATION EQUIPMENT CO., LTD, Shenzhen (CN)

(72) Inventor: Liyuan Luo, Shenzhen (CN)

(73) Assignee: SHENZHEN NANBO AUTOMATION EQUIPMENT CO., LTD, Shenzhen (CN)

( * ) Notice: Subject to any disclaimer, the term of this patent is extended or adjusted under 35 U.S.C. 154(b) by 643 days.

(21) Appl. No.: 18/150,802

(22) Filed: Jan. 6, 2023

(65) Prior Publication Data

US 2023/0147034 A1 May 11, 2023

Related U.S. Application Data

(63) Continuation of application No. PCT/CN2021/104928, filed on Jul. 7, 2021.

(30) Foreign Application Priority Data

| Jul. 10, 2020 | (CN) | ......................... 202021352969.2 |
| Jul. 10, 2020 | (CN) | ......................... 202021352974.3 |
| Jul. 10, 2020 | (CN) | ......................... 202021352975.8 |

(51) Int. Cl.
*B62M 1/30* (2013.01)
*B62M 1/28* (2013.01)
*F16H 37/12* (2006.01)

(52) U.S. Cl.
CPC ................ *B62M 1/30* (2013.01); *B62M 1/28* (2013.01); *F16H 37/124* (2013.01)

(58) Field of Classification Search
CPC .......... B62M 1/30; B62M 1/28; B62M 11/18; B62M 11/06; F16H 37/124
See application file for complete search history.

(56) References Cited

U.S. PATENT DOCUMENTS

| 1,773,996 A * | 8/1930 | Gordon | .................. B62M 11/06 |
| | | | 74/333 |
| 3,954,282 A * | 5/1976 | Hege | ........................ B62M 1/28 |
| | | | 280/251 |

(Continued)

FOREIGN PATENT DOCUMENTS

| CN | 1594013 A | 3/2005 |
| CN | 109501922 A | 3/2019 |

(Continued)

OTHER PUBLICATIONS

Internation Search Report of PCT/CN2021/104928, Mailed Oct. 8, 2021.

*Primary Examiner* — Timothy Wilhelm

(57) ABSTRACT

A transmission mechanism includes: a main shaft, a power input member, a gear component, and a one-way transmission component. The gear component is arranged on the main shaft. The one-way transmission component is sleeved on the main shaft. The one-way transmission component is connected with the power input member and the gear component. The one-way transmission component enables the gear component to perform one-way transmission under the action of the power input member. The gear component is connected with a power output member in a transmission way to change a rotation speed transmitted from the power input member to the power output member. The power input member performs reciprocating motion with the main shaft as an axis to drive the power output member to move. By arranging the one-way transmission component, the transmission mechanism can perform arc reciprocating motion, thereby improving transmission efficiency.

8 Claims, 17 Drawing Sheets

(56)                References Cited

U.S. PATENT DOCUMENTS

| | | | | |
|---|---|---|---|---|
| 3,984,129 A * | 10/1976 | Hege | B62M 1/28 | 280/251 |
| 4,052,912 A * | 10/1977 | Vukelic | B62M 1/28 | 74/594.1 |
| 4,473,236 A * | 9/1984 | Stroud | B62M 1/30 | 280/258 |
| 4,716,982 A * | 1/1988 | Ishii | B60K 23/04 | 701/41 |
| 4,842,291 A * | 6/1989 | Hartmann | B62M 11/18 | 280/238 |
| 4,858,494 A * | 8/1989 | Healy | F16H 3/44 | 192/81 C |
| 4,941,095 A * | 7/1990 | Imaseki | B60K 23/04 | 701/41 |
| 4,949,265 A * | 8/1990 | Eguchi | B60K 23/0808 | 701/42 |
| 4,949,984 A * | 8/1990 | Uemura | B62D 7/1527 | 180/409 |
| 5,103,925 A * | 4/1992 | Imaseki | B62D 7/159 | 701/41 |
| 5,212,642 A * | 5/1993 | Tanaka | B62D 7/1581 | 701/41 |
| 5,402,341 A * | 3/1995 | Liubakka | B62D 7/159 | 701/42 |
| 5,716,069 A * | 2/1998 | Bezerra | B62M 1/30 | 280/253 |
| 5,734,570 A * | 3/1998 | Arlandis | B62D 6/00 | 701/41 |
| 5,964,332 A * | 10/1999 | King | B60B 27/023 | 192/64 |
| 6,089,114 A * | 7/2000 | Kang | B62M 11/06 | 74/331 |
| 6,296,072 B1 * | 10/2001 | Turner | B62K 19/48 | 180/65.6 |
| 6,318,198 B1 * | 11/2001 | Gordon | B62M 11/06 | 74/665 GA |
| 6,325,400 B1 * | 12/2001 | Lai | B62M 1/30 | 280/258 |
| 6,711,967 B1 * | 3/2004 | Lai | B62M 1/30 | 74/561 |
| 6,779,807 B2 * | 8/2004 | Huret | B62M 11/06 | 280/252 |
| 6,814,365 B2 | 11/2004 | Liu | | |
| 6,852,060 B1 * | 2/2005 | Ash | B62M 11/145 | 475/296 |
| 7,644,944 B2 * | 1/2010 | Nicolai | B62M 11/06 | 280/238 |
| 7,699,329 B2 | 4/2010 | Wesling et al. | | |
| 8,523,210 B1 * | 9/2013 | Tung | B62K 13/00 | 280/209 |
| 8,979,107 B2 * | 3/2015 | Lin | B62M 1/28 | 280/252 |
| 9,302,738 B2 * | 4/2016 | Lermen | F16H 57/021 | |
| 9,439,341 B2 * | 9/2016 | Bebernes | G05D 1/0278 | |
| 9,688,349 B2 * | 6/2017 | Thompson | B62M 1/26 | |
| 9,902,461 B2 * | 2/2018 | Bezerra | B63H 16/20 | |
| 10,279,861 B2 * | 5/2019 | Ferreira Marinho | B62M 5/00 | |
| 10,850,800 B2 * | 12/2020 | Schmertz | F16D 41/24 | |
| 11,161,544 B2 * | 11/2021 | De Grammont | B62D 7/142 | |
| 12,163,561 B2 * | 12/2024 | Van Druten | F16D 41/30 | |
| 2010/0320720 A1 * | 12/2010 | Bezerra | F16D 47/04 | 74/25 |
| 2014/0339787 A1 * | 11/2014 | Chung | B62M 11/16 | 280/257 |
| 2018/0244342 A1 * | 8/2018 | Macmartin | B60W 10/08 | |
| 2022/0107008 A1 * | 4/2022 | Rajendran | F16H 27/06 | |
| 2024/0092452 A1 * | 3/2024 | Hansen | B62M 1/24 | |

FOREIGN PATENT DOCUMENTS

| | | |
|---|---|---|
| CN | 111169586 A | 5/2020 |
| WO | 00078597 A1 | 12/2000 |

* cited by examiner

41

832                                                     831

834

833

TRANSMISSION MECHANISM AND BICYCLE

CROSS-REFERENCE TO RELATED APPLICATIONS

This application is a continuation of International Patent Application No. PCT/CN2021/104928 with a filing date of Dec. 28, 2016, designating the United States, now pending, and further claims priorities to Chinese Patent Application No. 202021352974.3 with a filing date of Jul. 10, 2020, Chinese Patent Application No. 202021352975.8 with a filing date of Jul. 10, 2020, and Chinese Patent Application No. 202021352969.2 with a filing date of Jul. 10, 2020. The content of the aforementioned applications, including any intervening amendments thereto, are incorporated herein by reference.

TECHNICAL FIELD

The present disclosure relates to the field of mechanical transmission mechanisms, and in particular, to a transmission mechanism and a bicycle using the same.

BACKGROUND

The existing bicycles or some vehicles generally take the transmission mechanism performing circular motion as the power source, but the transmission mechanism has the disadvantages of low transmission efficiency and low speed due to the transmission of ordinary gear components. In order to increase the speed of the bicycles or vehicles, the variable speed component is generally increased, which enlarges the transmission mechanism, greatly affecting the structural design of bicycles. In addition, the transmission mechanism performing circular motion transmission consumes some kinetic energy when its pedal component rotates from the lowest point to the highest point, affecting the transmission efficiency. Therefore, it is necessary to design a transmission mechanism to make the transmission efficiency and speed of bicycles or vehicles become higher, and its structure is relatively compact.

SUMMARY

A technical problem to be solved by the present disclosure is to provide a transmission mechanism and a bicycle in view of the above defects of the prior art, aiming at solving the problems of low transmission efficiency and low speed of an existing transmission mechanism.

In a first aspect, a technical solution adopted by the present disclosure to solve the technical problem is: a transmission mechanism, including: a main shaft, a power input member, a gear component, and a one-way transmission component. The gear component is arranged on the main shaft. The one-way transmission component is sleeved on the main shaft and connected with the power input member and the gear component, and enables the gear component to perform one-way transmission under the action of the power input member. The gear component is connected with a power output member in a transmission way to change a rotation speed transmitted from the power input member to the power output member. The power input member performs reciprocating motion with the main shaft as an axis to drive the power output member to move.

Further, the one-way transmission component is a one-way bearing or a ratchet component.

Further, the gear component is a sector gear component, including: a sector gear, a first gear, a second gear, and a third gear. The sector gear is arranged on the main shaft, and rotates with the main shaft as an axis. The first gear is arranged on an auxiliary shaft and meshed with the sector gear, and rotates with the auxiliary shaft as an axis. The second gear is arranged on the auxiliary shaft, and rotates with the auxiliary shaft as an axis. The third gear is connected with the second gear in a transmission way.

Further, the gear component is a planetary gear component. The main shaft further includes a shaft sleeve. The shaft sleeve is connected with the one-way transmission component. The planetary gear component includes: a first planetary carrier, a first planetary gear set, a gear ring, and a first solar gear. The first planetary carrier is fixedly connected with the shaft sleeve. The first planetary gear set is arranged on the first planetary carrier. The gear ring is meshed with the first planetary gear set. The first solar gear passes through the main shaft to be connected with the first planetary gear set in a transmission way, and is connected with the power output member in a transmission way.

Further, the gear component is a spur gear component. The main shaft further includes a shaft sleeve. The shaft sleeve is connected with the one-way transmission component. The spur gear component includes: a first gear, a second gear, a third gear, a fourth gear, and a fifth gear. The first gear and the second gear pass through the main shaft, and the second gear is fixedly connected with the shaft sleeve. The third gear passes through and is fixed on an auxiliary shaft, and is meshed with the second gear. The fourth gear passes through and is fixed on the auxiliary shaft. The fourth gear and the third gear are fixedly connected or integrally formed. The fifth gear passes through the main shaft and is fixedly connected with the first gear, and is meshed with the fourth gear.

Further, the transmission mechanism includes a second solar gear, a second planetary carrier, and a second planetary gear set. The second planetary gear set shares the gear ring with the first planetary gear set. The second planetary gear set is arranged in the gear ring and meshed with the gear ring. The second solar gear is meshed with the first planetary gear set and fixedly connected with the second planetary carrier.

Further, the one-way bearing is divided into an inner race and an outer race, the inner race is connected with the first planetary carrier, and the outer race is connected with the power input member.

Further, the ratchet component includes a ratchet, a pawl plate, and a pawl. The pawl is arranged on the pawl plate. The pawl is meshed with the ratchet. The pawl plate is fixedly connected with the power input member. The ratchet is fixedly connected with the first planetary carrier.

Further, the ratchet component further includes a butting piece. The butting piece is fixed on the gear ring. The pawl is pressed down by the butting piece to disengage from meshing with ratchet teeth when rotating to the butting piece, such that the ratchet is rotatable freely.

Further, the transmission mechanism includes another one-way transmission component sleeved on the shaft sleeve, connected with another power input member, and driving the gear component to rotate under the action of the other power input member.

In a second aspect, the present disclosure further provides a bicycle, including a frame, a driving wheel, and a transmission mechanism as described above. The driving wheel is arranged on the frame. The power input member is a pedal component. The transmission mechanism is connected with the driving wheel in a transmission way.

Further, the bicycle further includes a reset mechanism connected with the pedal component to drive the pedal component to rotate and reset.

Further, the reset mechanism is an elastic member. The elastic member includes one end connected with the frame and a second end connected with the pedal component.

In a third aspect, the present disclosure also provides a bicycle, including a frame, a driving wheel, and a transmission mechanism as described above. The driving wheel is arranged on the frame. The power input member is a pedal component. The transmission mechanism is arranged on the driving wheel, and the main shaft of the transmission mechanism is fixedly connected with an axle of the driving wheel coaxially.

The present disclosure has the following beneficial effects: by arranging the one-way transmission component, the transmission mechanism can perform arc reciprocating motion, which can reduce the kinetic energy consumed by ordinary circular motion transmission from the lowest point to the highest point, thereby improving transmission efficiency. Further, the sector gear component, the planetary gear component, and the spur gear component are used as the transmission component, which can further improve the transmission efficiency. In addition, since its transmission ratio is greater than that of the ordinary gear, the speed of transmission from the power input member to the power output member is greatly increased, which can effectively improve the transmission efficiency and speed of bicycles or other equipment using the transmission mechanism. Furthermore, due to the structural characteristics of the planetary gear, the volume of the transmission mechanism can be reduced, helping to make the structure of the transmission mechanism more compact.

Then, the bicycle is provided with the transmission mechanism of the present disclosure, and further provided with the reset mechanism, so the driving mode of the transmission mechanism is to rotate from top to bottom, and reset through the reset mechanism. Therefore, there is no problem that the pedal lever is zero or close to zero during the traditional bicycle riding, resulting in a large power loss. In addition, through the stress mode of the transmission mechanism and the supporting function of the bearing seat and grip, riders can obtain the jacking force from the bearing seat and grip during riding, which increases the driving power and effectively solves the problems of low efficiency and insufficient power of existing bicycles.

Moreover, the pedal component performs reciprocating motion along the outer surface of the driving wheel with the transmission mechanism as the center of the circle, such that the user can ride the bicycle in a standing posture, to avoid the impact on the comfort due to the seat cushion squeezing the hip. In case of sudden danger, the user can immediately get away from the bicycle due to the standing posture, which is relatively safe, and it is more convenient and fast than the ordinary bicycle when the user gets off the bicycle normally.

BRIEF DESCRIPTION OF THE DRAWINGS

The specific implementation of the present disclosure will be further described in detail below with reference to the accompanying drawings and specific embodiments. In the drawings.

Figure 1:
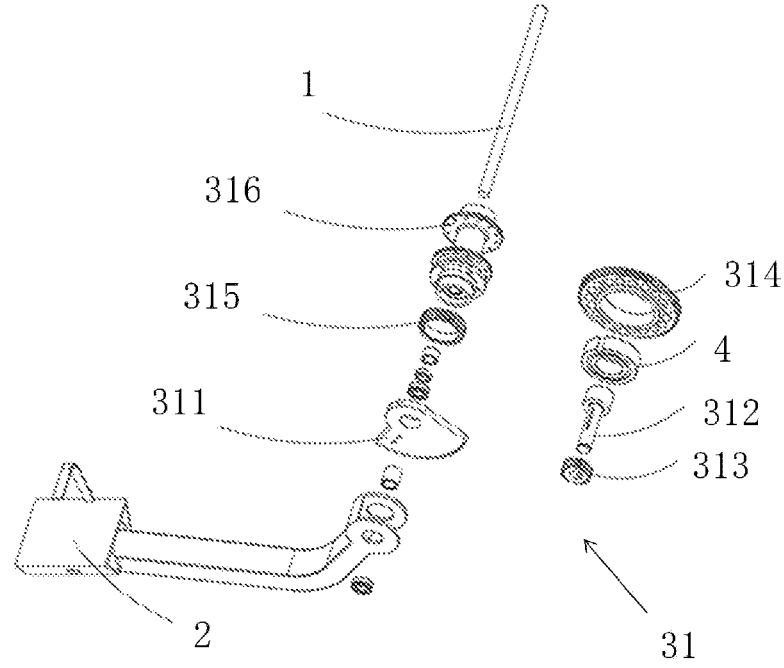
FIG. 1 is an explosive structure diagram of a transmission mechanism with a sector gear component of the present disclosure.

REFERENCE NUMERALS 1, main shaft; 2, power input member; 21, first power input member; 22, second power input member; 31, sector gear component; 311, sector gear; 312, auxiliary shaft; 313, first gear; 314, second gear; 315, third gear; 316, hub; 32, spur gear component; 321, shaft sleeve; 322, first gear; 323, second gear; 324, third gear; 325, fourth gear; 326, fifth gear; 327, auxiliary shaft; 33, planetary gear component; 331, first planetary carrier; 332, first planetary gear set; 333, gear ring; 334, first solar gear; 335, shaft sleeve; 336, mounting seat; 3311, second solar gear; 3312, second planetary carrier; 3313, second planetary gear set; 4, one-way transmission component; 41, one-way bearing; 42, ratchet component; 421, ratchet; 422, pawl plate; 423, pawl; 424, butting piece; 43, first one-way transmission component; 44, second one-way transmission component; 5, power output member; 6, pedal component; 61, pedal; 7, driving wheel; 8, reset mechanism; 81, elastic member; 811, adjusting portion; 821, first conical gear; 822, second conical gear; 823, rotating shaft; and 824, third conical gear.

DETAILED DESCRIPTION OF THE EMBODIMENTS

The preferred implementations of the present disclosure are described below with reference to the drawings. Those skilled in the art should understand that the implementations herein are merely intended to explain the technical principles of the present disclosure, rather than to limit the protection scope of the present disclosure. The preferred embodiment of the present disclosure is described in detail with reference to the accompanying drawings.

The present disclosure provides a transmission mechanism, including: a main shaft, a power input member, a gear component, and a one-way transmission component. The gear component is arranged on the main shaft. The one-way transmission component is sleeved on the main shaft and connected with the power input member and the gear component, and enables the gear component to perform one-way transmission under the action of the power input member. The gear component is connected with a power output member in a transmission way to change a rotation speed transmitted from the power input member to the power output member. The power input member performs reciprocating motion with the main shaft as an axis to drive the power output member to move. The one-way transmission component may be a one-way bearing or a ratchet component.

A first embodiment of the present disclosure, as shown in FIG. 1, includes: a main shaft 1, a power input member 2, a sector gear component 31, and a one-way transmission component 4. The gear component here adopts the sector gear component 31. The sector gear component 31 includes: a sector gear 311, an auxiliary shaft 312, a first gear 313, a second gear 314, and a third gear 315. The sector gear 311 is arranged on the main shaft 1. The sector gear 311 rotates with the main shaft 1 as an axis. The auxiliary shaft 312 is connected with the sector gear 311 in a transmission way. The first gear 313 is arranged on the auxiliary shaft 312. The first gear 313 is meshed with the sector gear 311. The first gear 313 rotates with the auxiliary shaft 312 as an axis. The third gear 315 is connected with a hub 316. The third gear 315 is connected with the second gear 314 in a transmission way.

Figure 2:
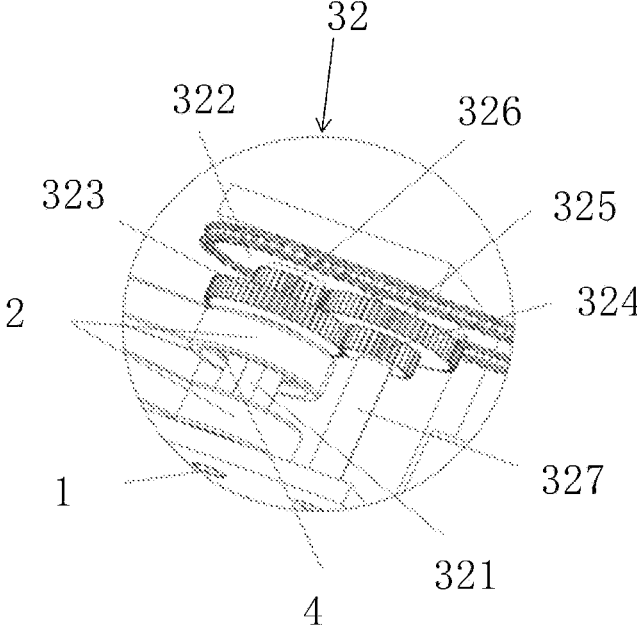
FIG. 2 is an overall structure diagram of a transmission mechanism with a spur gear component of the present disclosure.

In a second embodiment of the present disclosure, as shown in FIG. 2, the gear component adopts a spur gear component 32. The main shaft 1 further includes a shaft sleeve 321. The shaft sleeve 321 is connected with the one-way transmission component 4. The spur gear component 32 includes: a first gear 322, a second gear 323, a third gear 324, a fourth gear 325, and a fifth gear 326. The first gear 322 and the second gear 323 pass through the main shaft 1, and the second gear 323 is fixedly connected with the shaft sleeve 321. The third gear 324 passes through and is fixed on an auxiliary shaft 327. The third gear 324 is meshed with the second gear 323. The fourth gear 325 passes through and is fixed on the auxiliary shaft 327. The fourth gear 325 and the third gear 324 are fixedly connected or integrally formed. The fifth gear 326 passes through the main shaft 1 and is fixedly connected with the first gear 322. The fifth gear 326 is meshed with the fourth gear 325.

Figure 3:
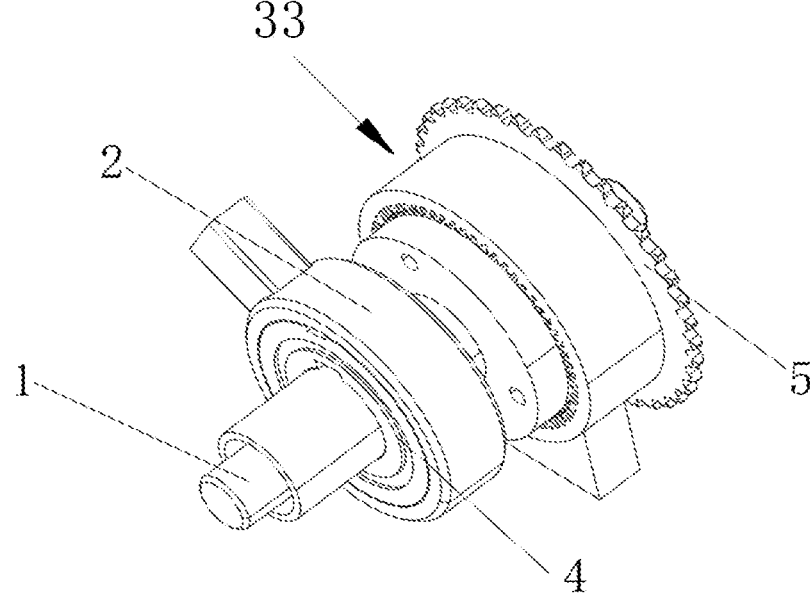
FIG. 3 is an overall structure diagram of an embodiment of a transmission mechanism with a planetary gear component of the present disclosure.

A third embodiment of the present disclosure, as shown in FIG. 3, includes: a main shaft 1, a power input member 2, a planetary gear component 33, and a one-way transmission component 4. The planetary gear component 33 is arranged on the main shaft 1. The one-way transmission component 4 is sleeved on the main shaft 1. The one-way transmission component 4 is connected with the power input member 2 and is connected with the planetary gear component 33 in a transmission way. The one-way transmission component 4 enables the planetary gear component 33 to perform one-way transmission under the action of the power input member 2. The planetary gear component 33 is connected with a power output member 5 in a transmission way and is configured to change a rotation speed transmitted from the power input member 2 to the power output member 5. The power input member can perform reciprocating motion with the main shaft as an axis to drive the power output member to move.

By arranging the one-way transmission component 4, the transmission mechanism can perform arc reciprocating motion, which can reduce the kinetic energy consumed by ordinary circular motion transmission from the lowest point to the highest point, thereby improving transmission efficiency. Further, the planetary gear component 33 is used as the transmission component, which can further improve the transmission efficiency. In addition, since its transmission ratio is greater than that of the ordinary gear, the speed of transmission from the power input member 2 to the power output member 5 is greatly increased, which can effectively improve the transmission efficiency and speed of bicycles or other equipment using the transmission mechanism. In addition, due to the structural characteristics of the planetary gear, the volume of the transmission mechanism can be reduced, helping to make the structure of the transmission mechanism more compact.

Figure 4:
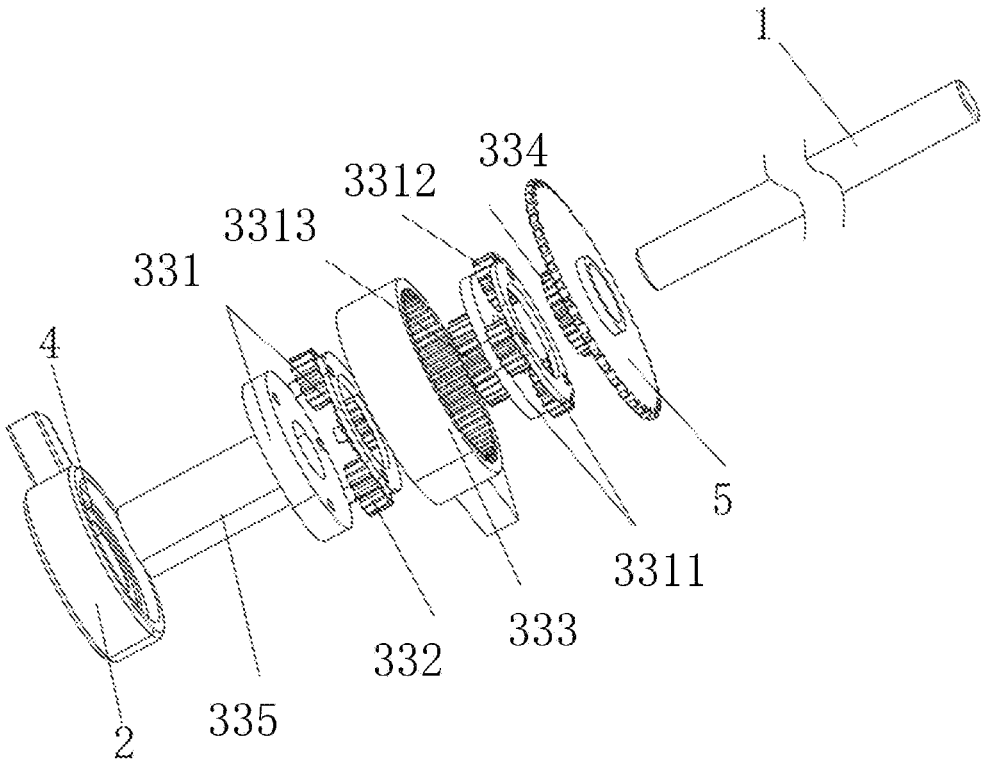
FIG. 4 is an explosive structure diagram of an embodiment of the transmission mechanism with a planetary gear component of the present disclosure.
Figure 5:
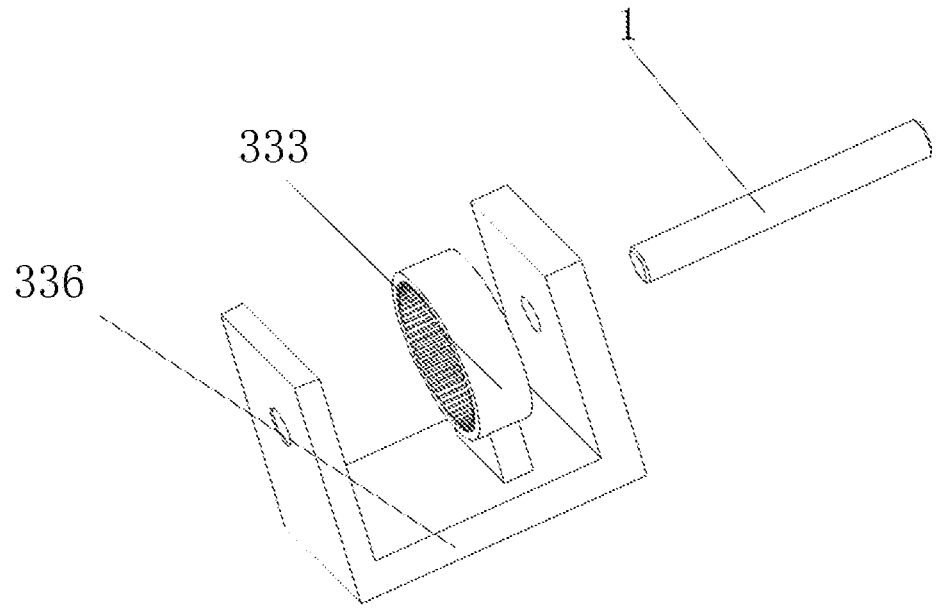
FIG. 5 is a schematic structural diagram of a gear ring and a mounting seat of the present disclosure.

In the above embodiments, when the gear component adopts the planetary gear component 33, as shown in FIG. 4 and FIG. 5, the planetary gear component 33 includes: a first planetary carrier 331, a first planetary gear set 332, a gear ring 333, and a first solar gear 334. The first planetary carrier 331 is connected with the one-way transmission component 4 in a transmission way. The first planetary carrier 331 and a shaft sleeve 335 are fixedly connected or integrally formed. The first planetary gear set 332 is arranged on the first planetary carrier 331. The gear ring 333 is connected with a mounting seat 336. The mounting seat 336 is configured to fix the gear ring 333. The gear ring 333 is meshed with the first planetary gear set 332. The first solar gear 334 passes through the main shaft 1 to be connected with the first planetary gear set 332 in a transmission way, and is connected with the power output member 5 in a transmission way. Further, in order to increase the speed of the bicycle and meet the riding requirements, a second set of planetary gears can be added. With continuous reference to FIG. 4, for display, a schematic structure diagram of two sets of planetary gears is shown, including a second solar gear 3311, a second planetary carrier 3312, and a second planetary gear set 3313. The second planetary gear set 3313 shares the gear ring 333 with the first planetary gear set 332. At this time, the second planetary gear set 3313 is arranged in the gear ring 333 and meshed with the gear ring 333. The second solar gear 3311 is meshed with the first planetary gear set 332 and fixedly connected with the second planetary carrier 3312, so as to increase the rotation speed transmitted from the first planetary carrier 331 to the first solar gear 334, and finally to increase the speed transmitted to the power output member 5.

Figure 6:
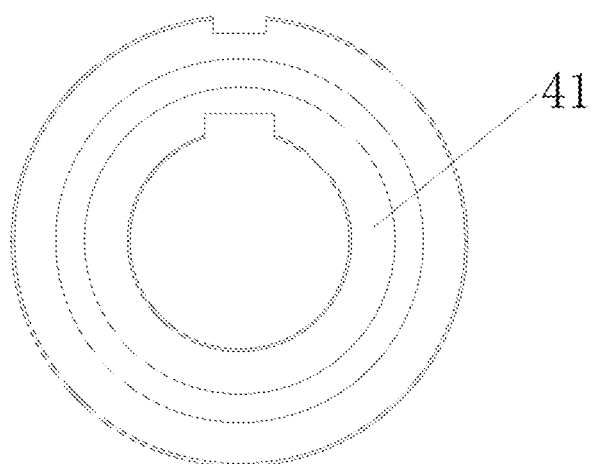
FIG. 6 is a front-view structure diagram of a one-way bearing.
Figure 7:
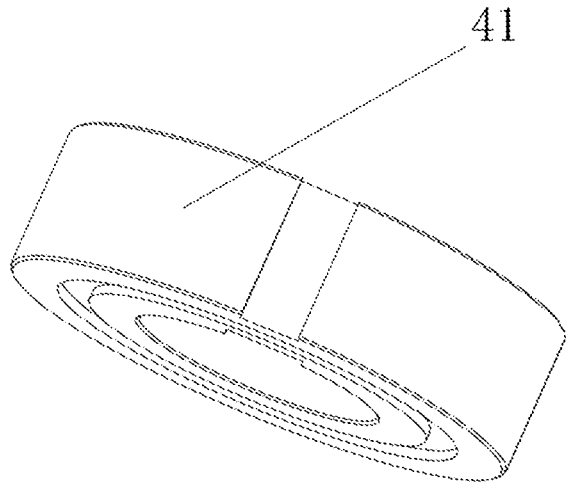
FIG. 7 is a schematic structural diagram of a second view of the one-way bearing.

As shown in FIG. 6 and FIG. 7, the one-way transmission component 4 is a one-way bearing 41, and the one-way bearing 41 is divided into an inner race and an outer race. The inner race is fixedly connected with the one-way transmission component 4 and the first planetary carrier 331, and the outer race is connected with the power input member 2. The one-way bearing 41 is a standard part, which easy to purchase and assemble.

Figure 8:
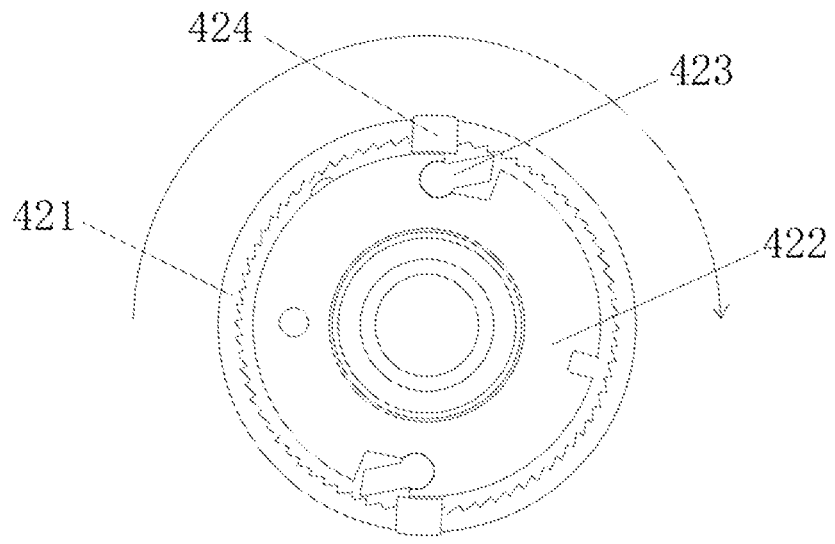
FIG. 8 is a schematic structural diagram of a ratchet component.
Figure 9:
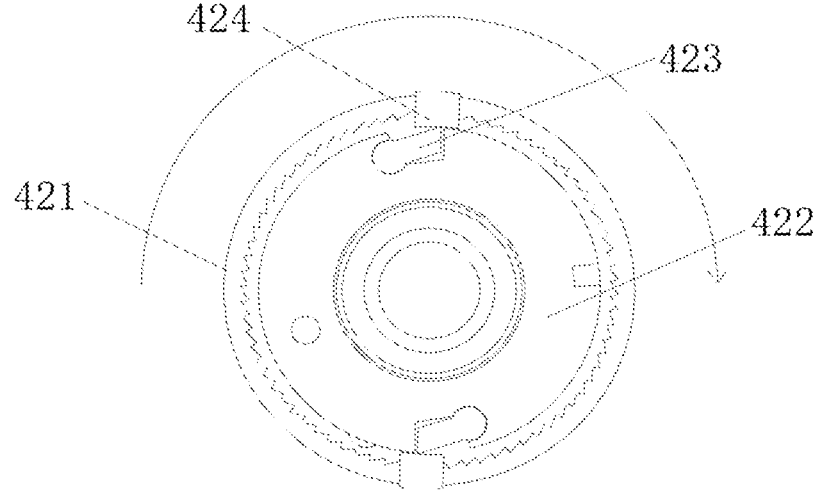
FIG. 9 is a schematic structural diagram of a second state of the ratchet component.

As shown in FIG. 8 and FIG. 9, the one-way transmission component 4 is a ratchet component 42. The ratchet component 42 includes a ratchet 421, a pawl plate 422, and a pawl 423. The pawl 423 is arranged on the pawl plate 422.

The pawl 423 is meshed with the ratchet 421. The pawl plate 422 is fixedly connected with the power input member 2. The ratchet 421 is fixedly connected with the first planetary carrier 331. The ratchet component 42 is a standard part, which easy to purchase and assemble.

Referring to FIG. 9, the ratchet component 42 and a butting piece 424 are shown. The butting piece 424 is fixed on the gear ring 333. The pawl 423 is pressed down by the butting piece 424 to disengage from meshing with ratchet teeth when rotating to the butting piece 424, such that the ratchet 421 is rotatable freely. In the bicycle with the existing transmission mechanism performing sector rotary motion, the wheel connected with the transmission mechanism drives the transmission mechanism to perform backward rotation when it reverses. However, due to the different design of the structures, the transmission mechanism cannot perform backward rotation, so the bicycle cannot reverse. In the present embodiment, the butting piece 424 is provided, such that the transmission mechanism of the present disclosure can reverse. The reversing process of the transmission mechanism of the present disclosure is as follows: the power input member 2 rotates to drive the pawl 423 on the plate 422 of the pawl 423 to rotate. The pawl 423 is pressed down by the butting piece 424 to disengage from meshing with ratchet teeth when rotating to the butting piece 424, such that the ratchet 421 is rotatable freely, and the power output member 5 is rotatable freely. When meshing is needed again, the power input member 2 is rotated to drive the pawl 423 on the plate 422 of the pawl 423 to rotate, such that the pawl 423 is disengaged from abutment with the butting piece 424, and the pawl 423 resumes the meshing with the ratchet teeth.

Figure 10:
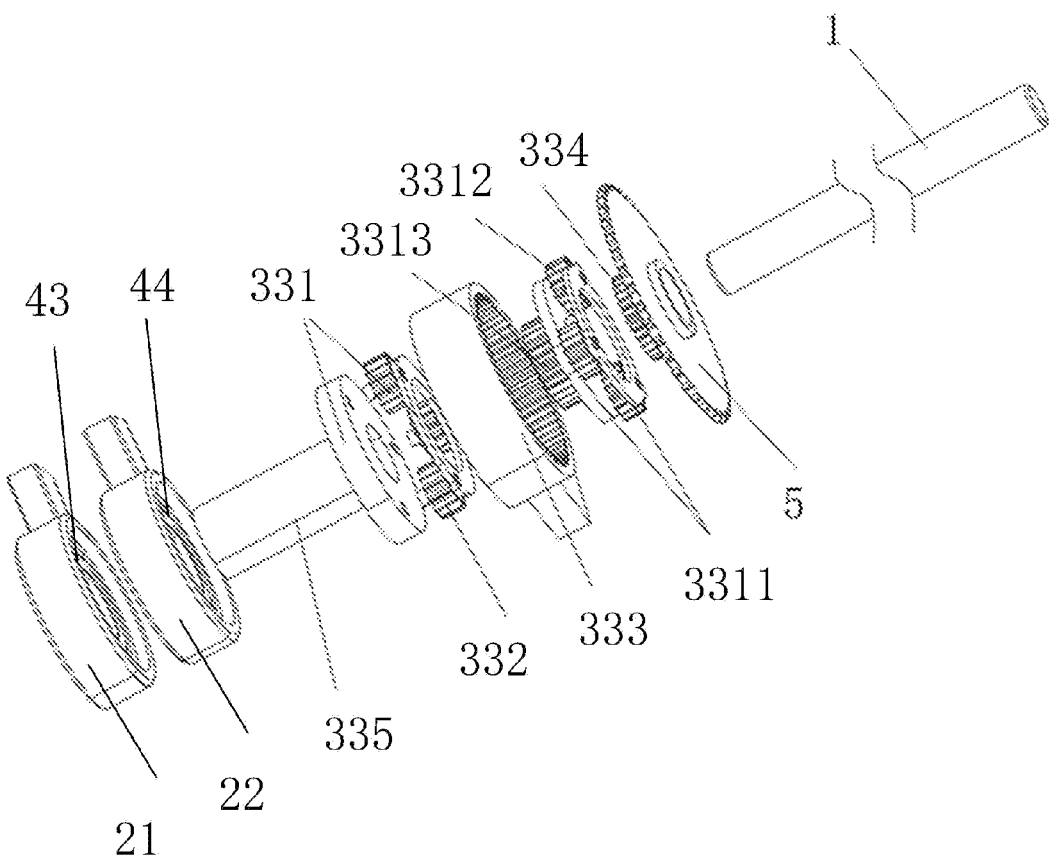
FIG. 10 is an explosive structure diagram of another embodiment of the transmission mechanism with a planetary gear component of the present disclosure.

In the above embodiments, when the gear component adopts the spur gear component, the transmission mechanism further includes another one-way transmission component 4 sleeved on the shaft sleeve 321. The other one-way transmission component 4 is connected with another power input member 2, and drives the gear component to rotate under the action of the other power input member 2. When the gear component adopts the planetary gear component, the transmission mechanism further includes another one-way transmission component 4 sleeved on the shaft sleeve 335. The other one-way transmission component 4 is connected with another power input member 2, and drives the gear component to rotate under the action of the other power input member 2. Specifically, referring to FIG. 10, the transmission mechanism includes a first one-way transmission component 43, a second one-way transmission component 44, a first power input member 21, and a second power input member 22. The shaft sleeve 335 is arranged on the main shaft 1, and is connected with the first one-way transmission component 43, and the first one-way transmission component 43 is connected with the first power input member 21. The second one-way transmission component 44 is sleeved on the shaft sleeve 335, and the second one-way transmission component 44 is connected with the second power input member 22, and is configured to drive the planetary gear component 33 to perform one-way transmission driven by the second power input member 22. By arranging two one-way transmission components 43 and 44, two power input members 21 and 22 are arranged correspondingly, so as to make the transmission mechanism more convenient for alternate transmission, improve riding experience and improve riding efficiency.

Figure 11:
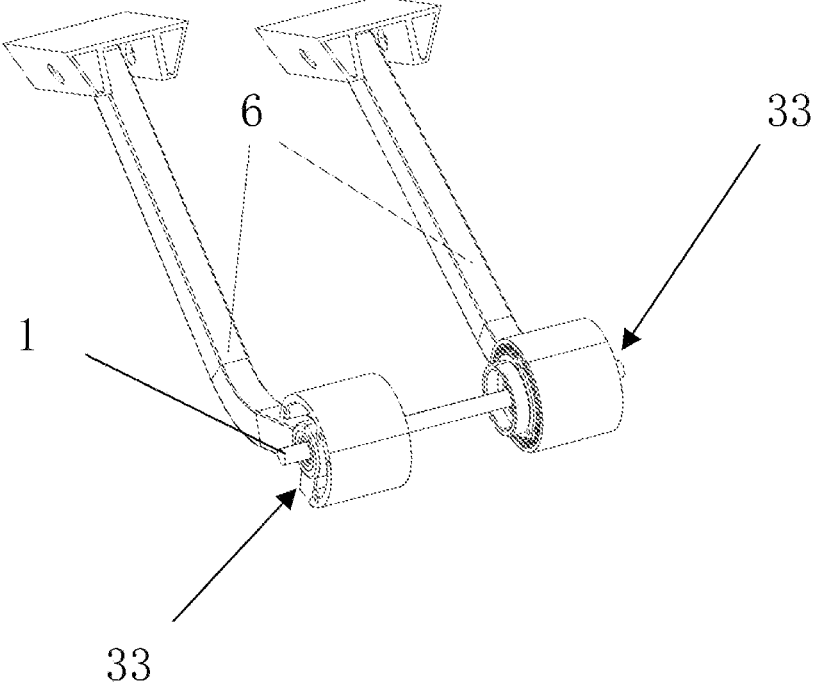
FIG. 11 is a schematic structural diagram of an embodiment of a pedal component.
Figure 12:
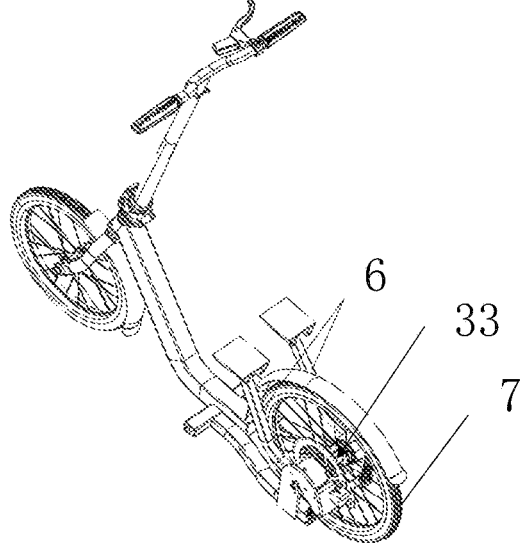
FIG. 12 is an overall structure diagram of an embodiment of the transmission mechanism of the present disclosure applied to a bicycle.

FIG. 11 and FIG. 12 show an embodiment of the transmission mechanism of the present disclosure applied to a bicycle. A bicycle includes a frame, a driving wheel, and a transmission mechanism as described above. In the embodiment of the present disclosure, the power input member 2 of the transmission mechanism is a pedal component 6. There are two pedal components 6 in the present embodiment. The main shaft 1 of the transmission mechanism is directly and fixedly connected with the driving wheel 7 coaxially. Thus, the driving wheel 7 can be driven to rotate through repeated cycle motion of the two pedal components 6. The driving wheel 7 can be either the rear wheel or the front wheel. In FIG. 12, the rear wheel is taken as an example but not limited to this. It should be noted here that in addition to the aforementioned frame, driving wheel and transmission mechanism, generally, a bicycle also includes other components relative to the driving wheel, such as a driven wheel, a handlebars, and a brake. However, since other components are generally known technologies, they will not be described here.

Figure 13:
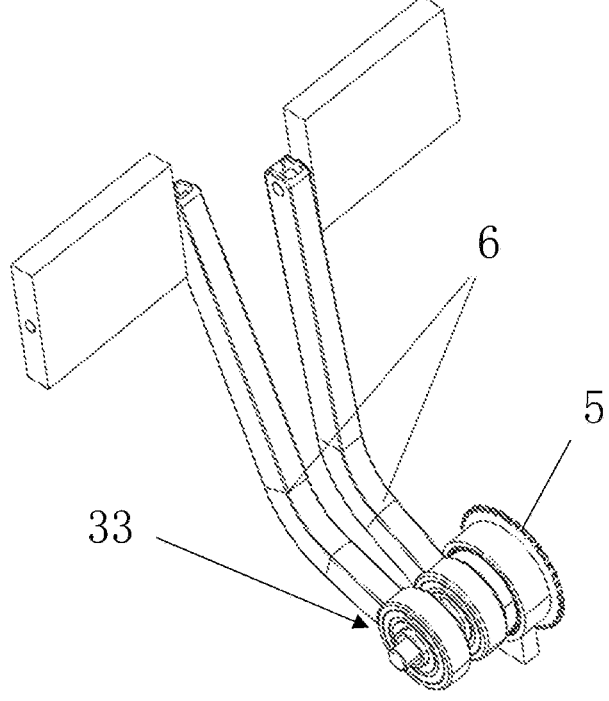
FIG. 13 is a schematic structural diagram of another embodiment of the pedal component.
Figure 14:
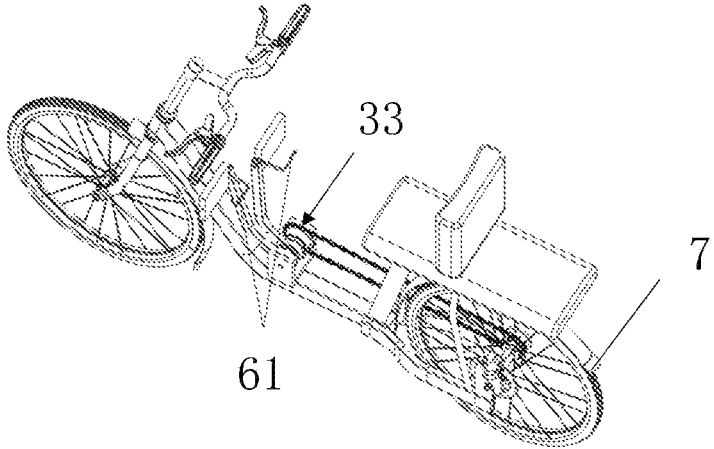
FIG. 14 is an overall structure diagram of another embodiment of the transmission mechanism of the present disclosure applied to a bicycle.

FIG. 13 and FIG. 14 show a second embodiment of the transmission mechanism of the present disclosure applied to a bicycle. In the present embodiment, the power input member 2 of the transmission mechanism is also a pedal component 6. There are two pedal components 6. The power output member 5 of the transmission mechanism is connected with the driving wheel 7 in a transmission way. The transmission connection can be realized by means of a chain, belt or screw. Thus, the two pedal components 6 move in a cycle to drive the power output member 5 to rotate, and drive the driving wheel 7 to rotate through the power output member 5. Likewise, the driving wheel 7 can be either the front wheel or the rear wheel. In FIG. 14, the rear wheel is taken as the driving wheel 7 but not limited to this. Likewise, the transmission connection method can also be used to connect the front wheel in a transmission way, with the front wheel as the driving wheel 7.

With continuous reference to FIG. 14, in the above two embodiments of bicycles, the pedal component 6 can further include a foot cover 61. The foot cover 61 is arranged on the pedal component 6. The pedal component 6 can be reset through the rider's foot.

Figure 15:
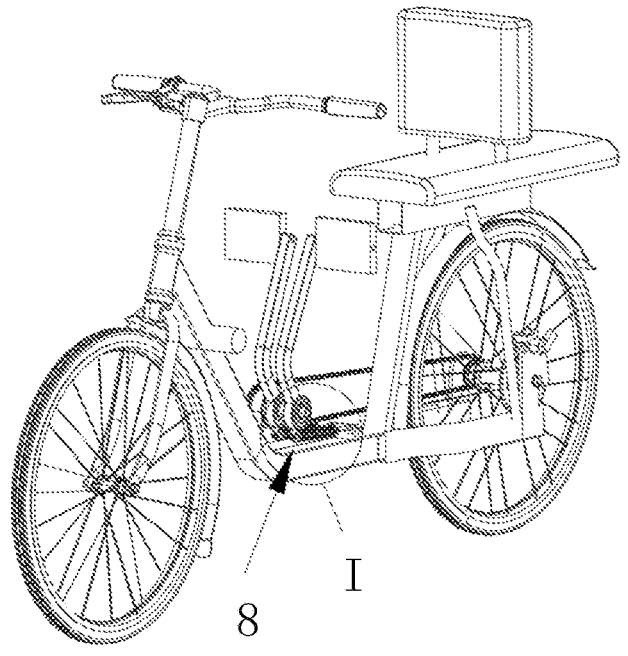
FIG. 15 is a schematic structural diagram of an embodiment of a reset mechanism in a bicycle.
Figure 16:
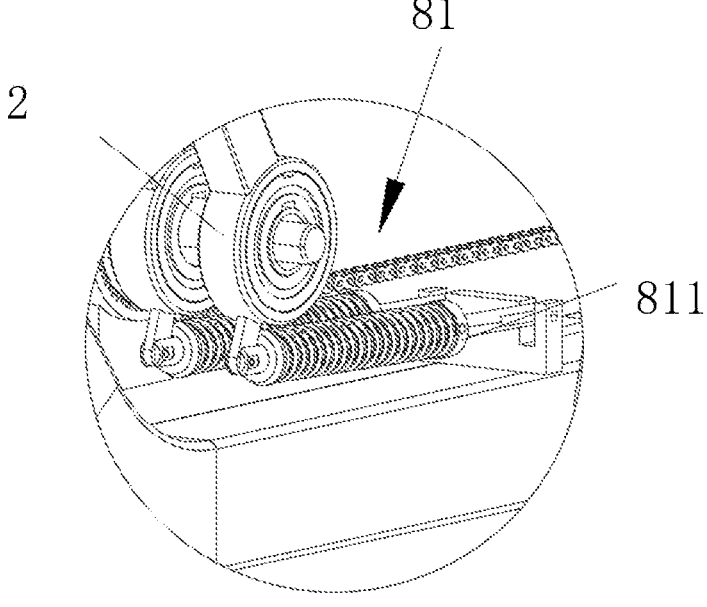
FIG. 16 is an enlarged structure diagram at I in FIG. 15.

Referring to FIG. 15 and FIG. 16, in the present embodiment, the bicycle further includes a reset mechanism 8. The reset mechanism 8 is connected with the pedal component 6 to drive the pedal component to rotate and reset. The reset mechanism 8 is an elastic member 81. The elastic member 81 includes one end connected with the frame and a second end connected with the pedal component 6. The cyclic drive resetting of the pedal component 6 can also be realized simply by stretching and resetting the elastic member 81. Further, the elastic member 81 is provided with an adjusting portion 811. The adjusting portion 811 is connected with the elastic member 81. The elastic force of the elastic member 81 can be changed by adjusting the position of the adjusting portion 811. After being used for a long time, the elastic force of the elastic member 81 is weakened. Therefore, the adjusting portion 811 needs to be arranged to adjust the elastic force of the elastic member 81, such that the reset of the pedal component 6 can be completed by the elastic force of the elastic member 81.

Figure 17:
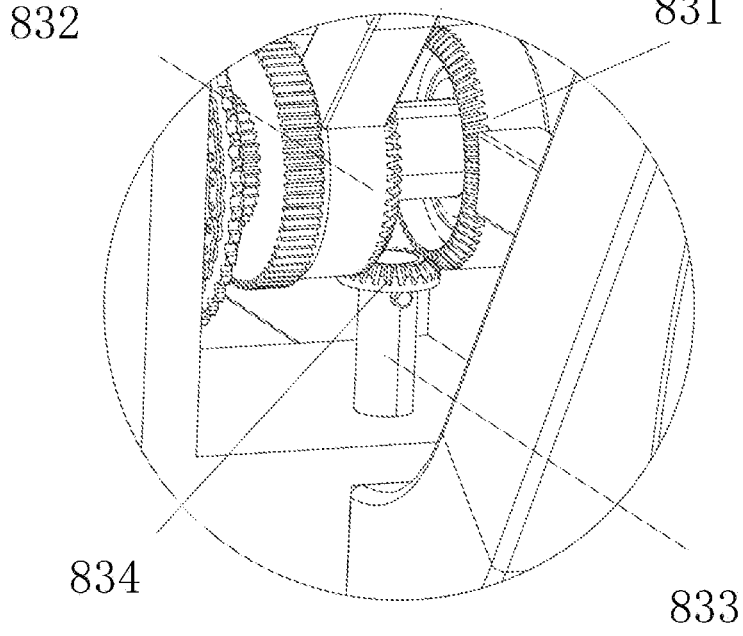
FIG. 17 is a schematic structural diagram of another embodiment of the reset mechanism of the bicycle.

Referring to FIG. 17, another embodiment of the reset mechanism 8 can include: a first conical gear 821, a second conical gear 822, a rotating shaft 823, and a third conical gear 824. The first conical gear 821 is sleeved and fixed on a pedal component 6. The second conical gear 822 is sleeved and fixed on another pedal component 6. The rotating shaft 823 is arranged on the frame. The third conical gear 824 passes through the rotating shaft 823 and is meshed with the first conical gear 821 and the second conical gear 822. The third conical gear 824 makes the rotating directions of the two pedal components 6 opposite. In the present embodiment, the reset mechanism 8 is a gear linkage reset mechanism. When the reset mechanism 8 is used, the initial positions of the two pedal components 6 are arranged opposite to each other. One pedal component 6 is located at the starting end of the rotation stroke and the other pedal component 6 is located at the ending end of the rotation stroke. Therefore, when riding, one pedal component 6 rotates forward and the other pedal component 6 rotates backward, which can make the two pedal components 6 rotate in a cycle.

Specifically, the transmission mechanism of the present disclosure can also be applied to water bicycles, pedal boats, electric bicycles, scooters and exercise bicycles. For details, reference can be made to the method of application to bicycles in FIG. 11 to FIG. 14, which will not be listed here. Any of the above pedal power tools adopts the transmission mechanism in the present embodiment and falls within the protection scope of the present disclosure.

It should be understood that the above embodiments are only used to explain the technical solution of the present disclosure, not to limit it. For those skilled in the art, the technical solution recorded in the above embodiments may be modified or some of the technical features may be replaced equivalently. All such modifications and substitutions shall fall within the scope of protection of the appended claims the present disclosure.

What is claimed is:

1. A transmission mechanism, comprising:
a main shaft;
a power input member;
a gear component, arranged on the main shaft; and
a one-way transmission component, sleeved on the main shaft, connected with the power input member and the gear component, and configured to enable the gear component to perform one-way transmission under an action of the power input member,
wherein the gear component is connected with a power output member in a transmission way to change a rotation speed transmitted from the power input member to the power output member; and
the power input member performs reciprocating motion with the main shaft as an axis to drive the power output member to move;
the one-way transmission component is a ratchet component;
the gear component is a planetary gear component, the main shaft further comprises a shaft sleeve, the shaft sleeve is connected with the one-way transmission component, and the planetary gear component comprises:
a first planetary carrier, fixedly connected with the shaft sleeve;
a first planetary gear set, arranged on the first planetary carrier;
a gear ring, meshed with the first planetary gear set; and
a first solar gear, passing through the main shaft to be connected with the first planetary gear set in a transmission way, and connected with the power output member in a transmission way;
wherein the ratchet component comprises a ratchet, a pawl plate, a butting piece and a pawl, the pawl is arranged on the pawl plate, the pawl is meshed with the ratchet, the pawl plate is fixedly connected with the power input member, and the ratchet is fixedly connected with the first planetary carrier; the butting piece is fixed on the gear ring, and the pawl is pressed down by the butting piece to disengage from meshing with ratchet teeth when rotating to the butting piece, such that the ratchet is rotatable freely;
wherein the transmission mechanism configured to reverse; the power input member rotates to drive the pawl on the plate of the pawl to rotate; the pawl is pressed down by the butting piece to disengage from meshing with ratchet teeth when rotating to the butting piece, such that the ratchet is rotatable freely, and the power output member is rotatable freely; when meshing is needed again, the power input member is rotated to drive the pawl on the plate of the pawl to rotate, such that the pawl is disengaged from abutment with the butting piece, and the pawl resumes the meshing with the ratchet teeth.

2. The transmission mechanism according to claim 1, wherein the gear component is a sector gear component, comprising:
a sector gear, arranged on the main shaft, and rotating with the main shaft as an axis;
an auxiliary shaft, connected with the sector gear in a transmission way;
a first gear, arranged on the auxiliary shaft, meshed with the sector gear, and rotating with the auxiliary shaft as an axis;
a second gear, arranged on the auxiliary shaft, and rotating with the auxiliary shaft as an axis; and
a third gear, connected with the second gear in a transmission way.

3. The transmission mechanism according to claim 1, comprising a second solar gear, a second planetary carrier, and a second planetary gear set, wherein the second planetary gear set shares the gear ring with the first planetary gear set, the second planetary gear set is arranged in the gear ring and meshed with the gear ring, and the second solar gear is meshed with the first planetary gear set and fixedly connected with the second planetary carrier.

4. The transmission mechanism according to claim 1, comprising another one-way transmission component sleeved on the shaft sleeve, connected with another power input member, and driving the gear component to rotate under the action of the other power input member.

5. A bicycle, comprising a frame, a driving wheel, and a transmission mechanism according to claim 1, wherein the driving wheel is arranged on the frame, the power input member is a pedal component, and the transmission mechanism is connected with the driving wheel in a transmission way.

6. The bicycle according to claim 5, further comprising a reset mechanism connected with the pedal component to drive the pedal component to rotate and reset.

7. The bicycle according to claim 6, wherein the reset mechanism is an elastic member, and the elastic member comprises one end connected with the frame and a second end connected with the pedal component.

8. A bicycle, comprising a frame, a driving wheel, and a transmission mechanism according to claim 1, wherein the driving wheel is arranged on the frame, the power input member is a pedal component, the transmission mechanism is arranged on the driving wheel, and the main shaft of the transmission mechanism is fixedly connected with an axle of the driving wheel coaxially.

* * * * *